US011641619B2

(12) United States Patent
Virtej et al.

(10) Patent No.: US 11,641,619 B2
(45) Date of Patent: May 2, 2023

(54) OPTIMIZED USER EQUIPMENT MEASUREMENTS FOR FAST CELL ACCESS

(71) Applicant: NOKIA TECHNOLOGIES OY, Espoo (FI)

(72) Inventors: Elena Virtej, Espoo (FI); Tero Henttonen, Espoo (FI); Lars Dalsgaard, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/044,650

(22) PCT Filed: Apr. 5, 2019

(86) PCT No.: PCT/EP2019/058690
§ 371 (c)(1),
(2) Date: Oct. 1, 2020

(87) PCT Pub. No.: WO2019/193175
PCT Pub. Date: Oct. 10, 2019

(65) Prior Publication Data
US 2021/0105707 A1   Apr. 8, 2021

Related U.S. Application Data

(60) Provisional application No. 62/653,922, filed on Apr. 6, 2018.

(51) Int. Cl.
*H04W 48/16*   (2009.01)
*H04W 76/15*   (2018.01)
(Continued)

(52) U.S. Cl.
CPC ........... *H04W 48/16* (2013.01); *H04W 24/10* (2013.01); *H04W 76/15* (2018.02); *H04W 76/30* (2018.02)

(58) Field of Classification Search
CPC ................. H04W 76/27; H04W 72/02; H04W 72/1231; H04W 72/0413; H04W 72/42;
(Continued)

(56) References Cited

U.S. PATENT DOCUMENTS 8,954,052 B2 * 2/2015 Huang .................... H04L 43/00
455/423
10,368,393 B2   7/2019 Lunden et al.
(Continued)

FOREIGN PATENT DOCUMENTS

| JP | 2013123273 A * | 6/2013 | ......... H04L 41/0631 |
| WO | WO-2020156377 A1 * | 8/2020 | ........ H04W 52/0229 |
| WO | WO-2020251466 A1 * | 12/2020 | ............ H04W 76/27 |

OTHER PUBLICATIONS

S. Avallone, N. Pasquino, S. Zinno and D. Casillo, "Smartphone-based measurements of LTE network performance," 2017 IEEE International Instrumentation and Measurement Technology Conference (I2MTC), 2017, pp. 1-6, doi: 10.1109/I2MTC.2017.7969854. Jul. 2017 (Year: 2017).*

(Continued)

*Primary Examiner* — William D Cumming
(74) *Attorney, Agent, or Firm* — Squire Patton Boggs (US) LLP (57) ABSTRACT

Various communication systems may benefit from taking appropriate measurements. For example, certain wireless communication systems may benefit from optimized user equipment measurements for fast cell access. A method can include receiving, at a user equipment, a configuration from a network to which the user equipment is connected. The configuration may include instructions to the user equipment regarding measurements with respect to detected cells. The method may also include performing the measurements
(Continued)

according to the received configuration, and reporting the measurements to the network.

19 Claims, 3 Drawing Sheets

(51) Int. Cl.
*H04W 76/30* (2018.01)
*H04W 24/10* (2009.01)

(58) Field of Classification Search
CPC ............ H04W 24/02; H04W 76/1231; H04W 52/0229; H04W 72/13; H04W 75/27; H04W 48/12
USPC .... 455/70, 418, 422.1, 452.1, 436; 370/252, 370/311, 312, 329, 331, 328
See application file for complete search history.

(56) References Cited

U.S. PATENT DOCUMENTS

| | | | | |
|---|---|---|---|---|
| 2009/0124212 A1* | 5/2009 | Islam | ................... | H04W 76/27 455/70 |
| 2009/0124249 A1* | 5/2009 | Young | ................... | H04W 76/27 455/422.1 |
| 2009/0129339 A1* | 5/2009 | Young | ................ | H04W 72/042 370/331 |
| 2010/0309836 A1* | 12/2010 | Sugawara | .......... | H04W 72/1231 370/312 |
| 2011/0083066 A1* | 4/2011 | Chung | .................. | H04L 1/0072 714/E11.032 |
| 2011/0235743 A1* | 9/2011 | Lee | ....................... | H04L 5/0073 375/295 |
| 2011/0287767 A1* | 11/2011 | Huang | ................... | H04L 43/00 455/436 |
| 2011/0306352 A1* | 12/2011 | Young | ................... | H04W 72/02 455/452.1 |
| 2012/0039189 A1* | 2/2012 | Suzuki | ................. | H04W 48/12 370/252 |
| 2012/0307703 A1* | 12/2012 | Young | ............... | H04W 72/0413 370/328 |
| 2012/0320811 A1* | 12/2012 | Islam | .................. | H04W 72/042 370/328 |
| 2013/0128787 A2* | 5/2013 | Young | ............... | H04W 72/0413 370/328 |
| 2013/0295905 A1* | 11/2013 | Islam | ................... | H04W 72/02 455/418 |
| 2013/0336258 A1* | 12/2013 | Young | ................ | H04W 72/042 370/329 |
| 2015/0208397 A1* | 7/2015 | Lee | ....................... | H04L 5/0073 370/329 |
| 2017/0013672 A1* | 1/2017 | Islam | ................ | H04W 72/0413 |
| 2017/0237533 A1* | 8/2017 | Lee | ....................... | H04L 5/0007 375/260 |
| 2017/0359747 A1 | 12/2017 | Lunden et al. | | |
| 2019/0150014 A1 | 5/2019 | Virtej et al. | | |
| 2020/0022207 A1* | 1/2020 | Yu | ......................... | H04W 76/15 |
| 2020/0178245 A1* | 6/2020 | Islam | ................... | H04W 76/27 |
| 2020/0344629 A1* | 10/2020 | Kim | ................ | H04W 52/0209 |
| 2020/0351689 A1* | 11/2020 | Bao | ........................ | H04W 24/10 |
| 2021/0105707 A1* | 4/2021 | Virtej | .................... | H04W 76/15 |

OTHER PUBLICATIONS

W. Wu and N. Choi, "Providing voice service continuity in evolved packet systems," in IEEE Wireless Communications, vol. 17, No. 6, pp. 76-84, Dec. 2010, doi: 10.1109/MWC.2010.5675782. (Year: 2010).*
F. A. Latheef and M. A. Ingale, "On the UE Context Retrieval Enhancements for Improved Inter-RAT Mobility," 2020 IEEE 3rd 5G World Forum (5GWF), 2020, pp. 324-329, doi: 10.1109/5GWF49715.2020.9221422. (Year: 2020).*
A. Khlass, D. Laselva and R. Jarvela, "On the Flexible and Performance-Enhanced Radio Resource Control for 5G NR Networks," 2019 IEEE 90th Vehicular Technology Conference (VTC2019-Fall), 2019, pp. 1-6, doi: 10.1109/VTCFall.2019.8891551. (Year: 2019).*
Nokia, Alcatel-Lucent Shanghai Bell, "Motivation for New Work Item for Enhancing Utilization of CA for LTE" 3GPP TSG-RAN meeting #72, RP-161036, Agenda: 10.1.2, Nokia, Mar. 13-16, 2016, 5 pages.
Nokia, Alcatel-Lucent Shanghai Bell, "New WID for Enhancing CA Utilization", 3GPP TSG-RAN meeting #72, RP-161035, Agenda: 10.1.2, Nokia, Mar. 13-16, 2016, 8 pages.
Nokia, Alcatel-Lucent Shanghai Bell, "Motivation for New Work Item for Enhancing Utilization of CA for LTE", 3GPP TSG-RAN meeting #73, RP-161730, Agenda: 10.1.2, Nokia, Sep. 19-22, 2016, 5 pages.
Nokia, Alcatel-Lucent Shanghai Bell, "New WID for Enhancing CA Utilization", 3GPP TSG-RAN meeting #73, RP-161734, Agenda: 10.1.2, Nokia, Sep. 19-22, 2016, 8 pages.
Nokia, Alcatel-Lucent Shanghai Bell, "New WID on Enhancing CA Utilization", 3GPP TSG-RAN meeting #75, RP-170805, Agenda: 10.1.2, Nokia, Mar. 6-9, 2017, 4 pages.
International Search Report and Written Opinion dated Jun. 12, 2019 corresponding to International Patent Application No. PCT/EP2019/058690.
Qualcomm Incorporated: "Fast SCell Configuration and Activation Through network assisted RRC_Idle mode measurements," 3GPP Draft; R2-1707788, 3GPP TSG-RAN2 Meeting #99, Berlin, Germany, Aug. 20, 2017, XP051317748.
Ericsson: "CA establishment from Idle and Suspended," 3GPP Draft; R2-1711534, 3GPP TSG-RAN WG2 #99bis, Prague, Czech Republic, Oct. 8, 2017, XP051343504.
Nokia et al: "Simulation results for reducing SCell setup delay," 3GPP Draft; R2-1707820, 3GPP TSG-RAN WG2 #99, Berlin, Germany, Aug. 20, 2017, XP051317769.
Nokia et al: "Analysis of SCell setup delay," 3GPP Draft; R2-1707819, 3GPP TSG-RAN WG2 #99, Berlin, Germany, Aug. 21-25, 2017.
First Examination Report issued in corresponding Indian Patent Application No. 202047047895 dated Dec. 8, 2022.
Communication pursuant to Article 94(3) EPC issued in corresponding European Patent Application No. 19 718 086.2 dated Dec. 13, 2022.

* cited by examiner

OPTIMIZED USER EQUIPMENT MEASUREMENTS FOR FAST CELL ACCESS

CROSS-REFERENCE TO RELATED APPLICATIONS

This application claims priority from U.S. provisional patent application No. 62/653,922 filed on Apr. 6, 2018. The contents of this earlier filed application are hereby incorporated by reference in their entirety.

BACKGROUND

Field

Various communication systems may benefit from taking appropriate measurements. For example, certain wireless communication systems may benefit from optimized user equipment measurements for fast cell access.

Description of the Related Art

There may be various issues related to carrier aggregation (CA) or dual connectivity (DC) and especially to enhancing utilization of CA (euCA). For example, there may be various issues related to improving operation on and with fast (small) cell(s), in connection with new radio (NR) and accessing and utilizing cells in frequencies above 6 GHz, namely frequency range 2 (FR2). Similar issues may also arise related to improving operation on and with fast (small) cell(s), in connection with new radio (NR) and accessing and utilizing cells in frequencies under 6 GHz, namely frequency range 1 (FR1). Other types of frequency ranges could also have similar issues, and NR technology should only be considered an example case and not a limiting example. Similar procedures could also apply to other radio access technologies, for example Wireless LAN (WLAN) technology when used via DC.

When the user equipment (UE) is in CA/DC mode, the UE can be connected to both a macro cell and one or more (small) cells at the same time, but on separate carrier frequencies. When the UE's connection is released or suspended, the UE enters idle/inactive state and releases the CA/DC configuration(s). This means the UE enters single carrier operation mode, which was done to enable UE to save power by not monitoring multiple carriers.

When transitioning back to connected mode, the UE would not have any CA/DC configuration(s) and UE would need to be reconfigured such configuration again by the network. As baseline for any CA/DC configuration, the network would usually need a measurement report from the UE based on connected mode measurement configuration and measurements. Such CA/DC configuration setup take some time, as discussed in 3GPP technical report R2-1707819.

SUMMARY

According to an embodiment, a method can include receiving, at a user equipment operating in connected mode, a configuration from a network to which the user equipment is connected. The configuration includes instructions to the user equipment regarding measurements with respect to detected cells. The method may also include performing the measurements according to the received configuration, and reporting the measurements to the network.

According to another embodiment, a method can include communicating with a user equipment in a connected mode. The method can also include providing a configuration from a network to which the user equipment is connected. The configuration includes instructions to the user equipment regarding measurements with respect to detected cells. The method may also include receiving measurements from the user equipment according to the provided configuration.

In a variant, the configuration can instruct the user equipment to maintain measurements. In a variant, the measurements can be measurements of a detected cell. In a variant, the configuration can indicate a retention time for the measurements. In variants, the retention time can be explicitly or implicitly indicated.

In a variant, the configuration can instruct the user equipment to maintain a configuration of a detected cell. In a variant, the configuration can indicate how long the configuration of the detected cell is to be maintained. In a variant, the configuration of the detected cell can be indicated as to be maintained for as long as measurements are continued.

In a variant, the configuration can instruct the user equipment to perform measurements. In a variant, the configuration can instruct the user equipment to perform the measurements of specific carriers. In a variant, the configuration can instruct the user equipment to perform the measurements when transitioning to connected mode.

In a variant, the configuration can include a frequency to be measured other than a detected cell frequency. In a variant, the configuration can indicate that the frequency is to be measured when data exchange between the network and the user equipment is initiated.

According to another embodiment, an apparatus can include means for performing the method according to any embodiments or variants described herein.

According to another embodiment, an apparatus can include at least one processor and at least one memory including computer program code. The at least one memory and the computer program code can be configured to, with the at least one processor, cause the apparatus at least to perform the method according to any of the embodiments or variants described herein.

According to another embodiment, a computer program product may encode instructions for performing a process including the method according to any of the embodiments or variants described herein.

According to another embodiment, a non-transitory computer readable medium may encode instructions that, when executed in hardware, perform a process including the method according to any of the embodiments or variants described herein.

BRIEF DESCRIPTION OF THE DRAWINGS

For proper understanding of the invention, reference should be made to the accompanying drawings, wherein.

DETAILED DESCRIPTION

Certain embodiments relate to enabling fast(er) cell access when transitioning to connected mode from idle/inactive mode. As an example, certain embodiments use long term evolution (LTE) and LTE-NR DC operation. In general, certain embodiments also apply for NR and enhanced universal terrestrial radio access network (E-UTRAN)-NR Dual Connectivity (EN-DC).

More particularly, certain embodiments relate to enabling fast (small) cell access when UE is transitioning from idle or inactive state to connected state. This may reduce the latency of the CA/DC/EN-DC connection setup. Certain embodiments may be directly relevant to various aspects of enhanced utilization of CA (euCA). The method of certain embodiments is not limited to usage in LTE but can also be applied to other wireless systems such as, for example, NR.

An aim of LTE euCA work item as written in the 3GPP document RP-170805 is to enable fast small cell access for LTE. It has been observed that one of the main delay components in utilizing and accessing a secondary/small cell (SCell) is the lack of early availability of inter-frequency measurements for connection setup so that SCells could be configured as soon as possible. In many cases, this lack of measurements prevents using CA, because the latency to add CA often exceeds the connection time, leaving resources under-utilized and increasing UE power consumption. While the work item has been defined for euCA, the same issues and solutions are expected to apply to NR in a similar manner.

One option to address this challenge is that the UE can be indicated a specific inter-frequency carrier to measure while in idle mode and to report early during connection setup. By doing so, the UE can provide measurement results already at connection setup for potential SCells which significantly reduces the SCell configuration and utilization delay.

The UE can be indicated an inter-frequency carrier to measure during the idle state. The indication regarding the carrier(s) for which the UE could do the idle measurements can be included in system information block 5 (SIB5) and dedicated radio resource control (RRC) signaling, including a valid timer. The UE can indicate the availability of inter-frequency measurements in LTE RRC messages called RRCConnectionSetupComplete (when doing normal connection setup) or RRCConnectionResumeComplete (when resuming a connection that was previously suspended by eNB from connected mode to idle or inactive mode).

The UE may continue performing idle state euCA measurement after cell reselection. If the ongoing idle state measurement is configured only via SIB5 in the source cell, then after cell reselection, if the SIB5 of the target cell includes the idle state measurement configuration, the UE can continue performing IDLE state measurement and can update the configuration according to the SIB5 of the target cell. Alternatively, after cell reselection, if the SIB5 of the target cell includes no configuration for the idle state measurement, the UE can stop performing idle state measurement.

A timer controlling how long the UE measures cells in IDLE mode, which may be called T331, can start upon an RRC connection release message received by UE. A minimum SCell signal quality threshold for reporting may be configured by an evolved Node B (eNB).

One challenge is related to when and for how long time the UE should do the measurements on the indicated carrier(s), such that the UE power consumption is kept at a reasonable level, while inter-frequency measurements are kept up-to-dated. The timer T331 is one such mechanism.

One additional challenge also related to NR and especially when considering utilizing cells in FR2, namely carriers in bands above 6 GHz, is that the cells in FR2 may have fairly restricted coverage and may be deployed in a clustered manner to add extra network capacity in limited coverage areas or, for example, in home networks. Continuously searching and measuring such cells might be power consuming on the UE side. Consequently, it may be valuable to reduce the UE measurement effort, while keeping cell utilization high.

In certain embodiments, the network can indicate to UE to do the following when releasing UE to idle/inactive mode. The network can provide this indication by an access node, such an evolved Node B (eNB), base station, next generation Node B (gNB), or the like. The network can instruct the UE to maintain measurements of current SCell(s) for a certain period of time, determined implicitly or explicitly. The network can also instruct the UE to maintain configuration of current SCell(s), for example as long as the measurements are continued. The network can further instruct the UE to do measurements of given carriers when transitioning from idle or inactive mode to connected mode. These given carriers may be the SCell carriers or other carriers.

If the UE was configured with, for example an SCell in connected mode, the network can instruct the UE to keep the connected mode SCell configuration so that the UE can continue to measure the SCell, and possibly neighbor cells on the same carrier, even when released to idle/inactive mode. The measurements can continue while the UE sees the SCell as detectable (for example, above an implicit threshold, such as above a UE internal cell detection threshold) or above a given explicit threshold. Additionally, the network can indicate to the UE (for example, in the SCell configuration) whether the UE is to keep the configuration and continue to measure a specific SCell in idle mode. If the SCell is no longer detectable or measurable, the UE can discard the configuration, at least after waiting for a time period to ensure the cell is no longer detectable.

In one example, the network can also configure the UE with one or more carrier frequencies, for example inter-frequency carriers, to measure in addition to the SCells. These carriers may be indicated as not to be monitored according to normal inter-frequency carrier measurement requirements while in idle mode, but instead to be measured when data exchange between network and UE is initiated, for example when the UE starts the transition from idle/inactive mode to connected mode. The monitoring can include performing cell detection, measurements, logging the results in memory to be reported or the like.

In one example, the UE may be configured only to measure one or more of these indicated carriers when the data exchange is initiated. Data exchange may be initiated due to, for example, the UE receiving paging, the UE triggering physical random access channel (PRACH) or scheduling request (SR) transmission. This configuration may ensure that the UE starts measuring as early as possible, but does not need to measure continuously during idle/inactive mode.

Figure 1:
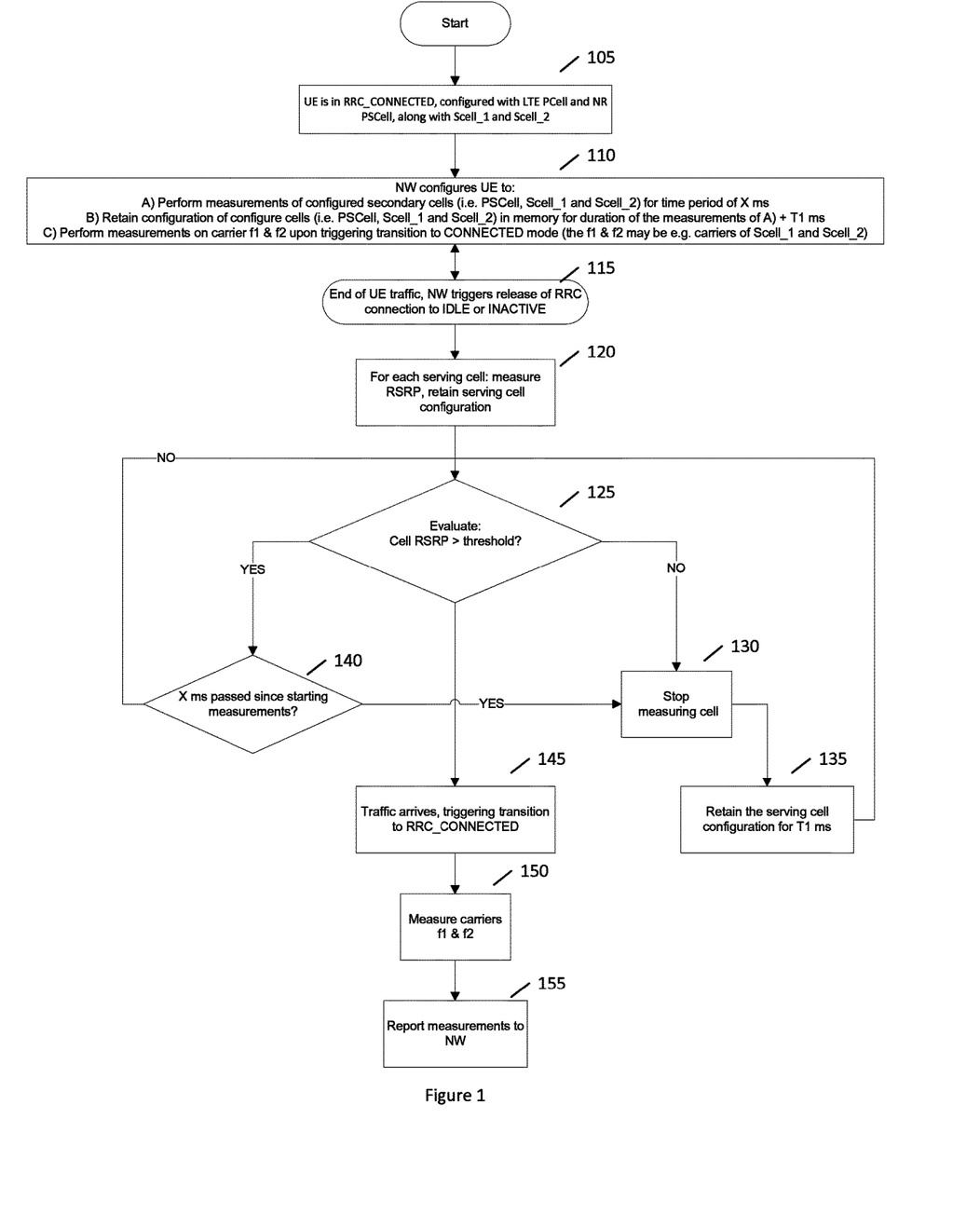
FIG. 1 illustrates a flow chart of certain embodiments.

In the following example, EN-DC is used to illustrate certain embodiments in a system supporting EN-DC with NR in a carrier in FR2. FIG. 1 illustrates a flow chart of certain embodiments.

At 105, the UE may be operating with PCell in LTE while the PSCell is to be in NR, once configured. Initially the UE would be operating in LTE configured with the proposed new inter-frequency carrier indicated as not being monitored according to existing/normal inter-frequency measurements. Instead, at 110, the carrier can be configured but indicated as only being necessary to measure once a given event is triggered. Such an event may include, for example, when data exchange is expected to start. Examples of such triggers include paging reception, SR transmission or PRACH transmission trigger.

At 115, there may be an end of UE traffic. The network can release an RRC connection to idle or inactive mode. Accordingly, at 120, for each serving cell the UE can measure reference signal received power (RSRP) and can retain serving cell configuration.

At 125, the UE can evaluate whether the RSRP exceeds a predetermined threshold. If not, then at 130 the UE can stop measuring the cell and at 135 the UE can retain the serving cell configuration for T1 ms. Otherwise, at 140, the UE can evaluate whether a predetermined number, X, ms have passed since starting measurements. If so, then at 130 the UE can stop measuring the cell. Otherwise, at 145, the UE can determine whether traffic has arrived or a paging has been received. If not, then the method can loop back to 125.

When traffic has arrived or paging has been received, at 146 the UE can determine whether a serving cell configuration has been maintained, which may be either because T1 ms has not passed or because RSRP has remained at or above a threshold. If the serving cell configuration has been maintained, then at 147 the UE can transition to RRC connected mode. At 150, the UE can measure carriers f1 and f2 (the measurement of these can be started when the transition to RRC connected mode is triggered, e.g. after new traffic arrives or paging is received from the network at 145). Finally, at 155, the UE can report the measurements to the network (NW). Optionally, if the UE has measured the previous SCell(s) recently to have good quality (for example, RSRP above threshold), it could report that to the network already before reporting at 155 if it takes longer to obtain measurements of carriers f1 & f2 (i.e. if UE is able to report previous SCell measurements sooner). This could be for example the case if the traffic arrives before X ms has passed (or soon after that) since starting measurements at 120. Alternatively, in another example, if the previous SCell(s) has still good quality based on UE's measurements in idle/inactive state, the step 150 could be omitted and UE would directly report the measurements of the previous SCell(s) at 155.

After 135, at 136 the UE can determine whether traffic has arrived or a paging has been received, just as at 145. If not, the UE can continue to make this determination periodically. Once traffic has been determined to be arrived and/or a paging has been determined to have been received at 136 or otherwise the serving cell configuration has not been maintained at 146, then at 137 the UE can transition to RRC connected, as at 147.

For example, in cases like these, the UE may start measurements on the indicated NR carrier in FR2. These measurements can be performed using a second receiver chain other than the transceiver chain used for accessing LTE. Thus, these measurements can be performed in parallel without disturbing, interrupting, or needing gaps on the LTE side.

Once results are ready, whether positive or negative outcome, the results can be reported to network. Reporting could be done on PCell, which may be E-UTRAN. Based on the reported measurements the network may configure NR PSCell.

Having been configured with NR (P)SCell, when connection is released and the UE enters idle mode, the UE can be configured to continue to remember the PSCell and measure the PSCell, and possible neighbor cells, in idle mode. The UE can measure the former PSCell during idle mode, for example while the PSCell stays detectable or alternatively while PSCell RSRP remains above a given threshold. When/if once again data exchange is initiated, the UE can send an early measurement report including the idle mode measured PSCell and/or neighbor cells.

In other embodiments, the (P)SCell may also belong to another radio access technology than NR, for example LTE or wireless local area network (WLAN). In such cases, the exact measurement quantity and cells may be defined differently, but the principle of measuring previously known (P)SCells is the same. They may be also multiple (P)SCells configured for the UE simultaneously, with the same mechanisms applied for each.

In certain embodiments, the configuration of (P)SCell can include an indication of whether the UE should keep the configuration and measure the (P)SCell after entering the idle mode. This configuration could also include a timer limiting the UE's additional measurement effort. Additionally, the UE could be configured to remember the (P)SCell configuration even after stopping the measurements and re-initiate the measurements when traffic activity starts again, so that measurement results of the previous (P)SCell may be available as soon as possible after connection setup. Additionally, the time duration for IDLE mode candidate SCell measurements could be adjusted based on, for example, the at least one of the following events. The events may include for example when a new cell is detected, measure more often on indicated carriers for potential SCell. The events may also include, if for example the measurement changed substantially, do more measurements.

Applying to the idle mode measurements of a previous (P)SCell or otherwise on an indicated carrier, the UE could measure less, or may stop idle mode measurements for a candidate SCells, while in idle mode based on at least one condition such as the following. For example, a condition may be if in time T a cell is not detected by UE, namely the cell Es/IoT becomes too low to be reliably detected by the UE cell search. Another example condition can be if in time T the UE has not detected and measured a cell that is stronger than a configured RSRP threshold, the threshold can be configured in broadcast or dedicated signaling. If the UE deems that the measurement results stay constant, the UE may reduce the frequency of the measurements to save power. For example, the UE may not be moving so may not need to measure frequently, and could adjust its measurement frequency based on its own determination of stationarity.

Figure 2:
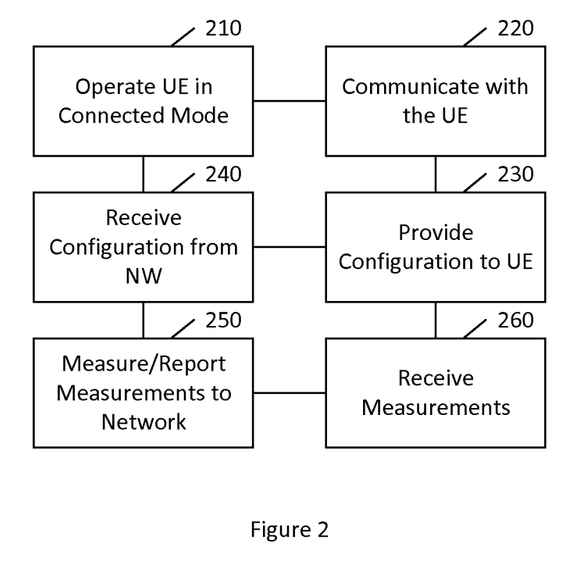
FIG. 2 illustrates a method according to certain embodiments.

FIG. 2 illustrates a method according to certain embodiments. The method can include, at 210, operating a user equipment in a connected mode. A network element, such as an access node, can communicate with the user equipment at 220.

The method can also include, at 230, providing, and at 240, receiving a configuration from a network to which the user equipment is connected. This can be from the same access node communicating at 220. The configuration can instruct the user equipment regarding measurements with respect to secondary cells.

The configuration can instruct the user equipment to maintain measurements. The measurements can be measurements of a current secondary cell.

The configuration can indicate a retention time for the measurements. The retention time can be explicitly or implicitly indicated.

The configuration can instruct the user equipment to maintain a configuration of a secondary cell. The configuration can indicate how long the configuration of the secondary cell is to be maintained. For example, the configuration may need to be maintained for as long as measurements are continued.

The configuration can instruct the user equipment to perform measurements. The configuration can instruct the user equipment to perform the measurements of specific carriers. The configuration can instruct the user equipment to perform the measurements when transitioning to connected mode.

The configuration can include a frequency to be measured other than a secondary cell frequency. The configuration can indicate that the frequency is to be measured and/or reported when data exchange between the network and the user equipment is initiated. The method can further include, at 250, measuring and/or reporting the measurement when the user equipment transitions to connected mode. These measurements can be received by the network at 260.

Figure 3:
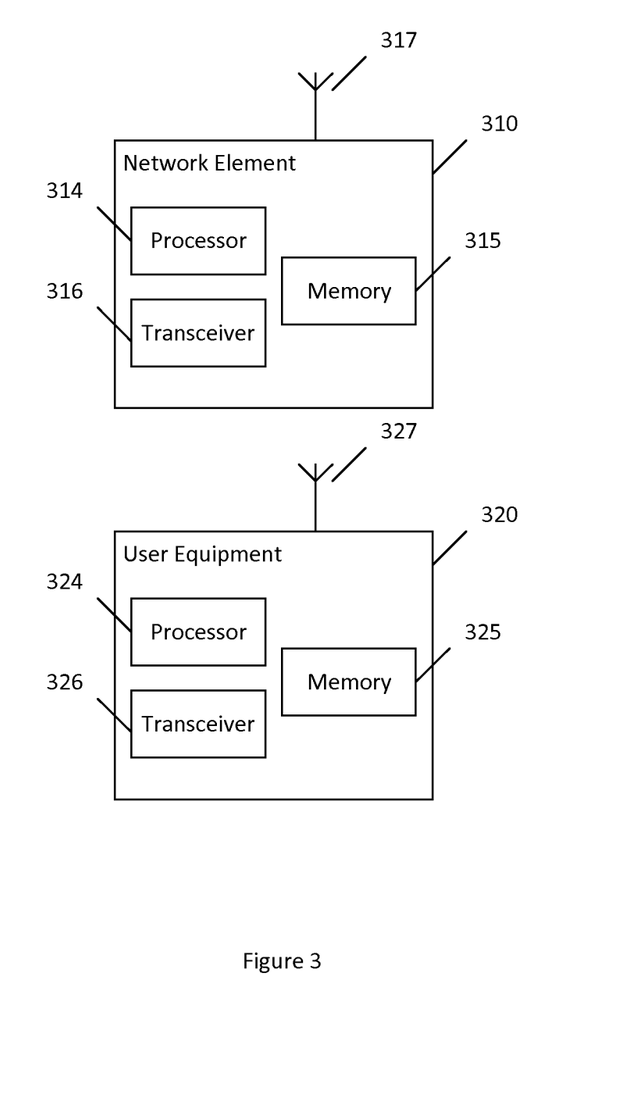
FIG. 3 illustrates a system according to certain embodiments.

FIG. 3 illustrates a system according to certain embodiments of the invention. It should be understood that each block of the flowchart of FIG. 1 and/or FIG. 2 may be implemented by various means or their combinations, such as hardware, software, firmware, one or more processors and/or circuitry. In one embodiment, a system may include several devices, such as, for example, network element 310 and user equipment (UE) or user device 320. The system may include more than one UE 320 and more than one network element 310, although only one of each is shown for the purposes of illustration. A network element can be an access point, a base station, an eNB, gNB, or any other network element, such as a PCell base station.

Each of these devices may include at least one processor or control unit or module, respectively indicated as 314 and 324. At least one memory may be provided in each device, and indicated as 315 and 325, respectively. The memory may include computer program instructions or computer code contained therein, for example for carrying out the embodiments described above. One or more transceiver 316 and 326 may be provided, and each device may also include an antenna, respectively illustrated as 317 and 327. Although only one antenna each is shown, many antennas and multiple antenna elements may be provided to each of the devices. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 320 may be a sensor or smart meter, or other device that may usually be configured for a single location.

In an exemplifying embodiment, an apparatus, such as a node or user device, may include means for carrying out embodiments described above in relation to FIGS. 1 and 2.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIGS. 1 and 2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS euCA enhancing utilization of CA
CA Carrier Aggregation
DC Dual Connectivity
EN-DC E-UTRAN Dual Connectivity
RAN Radio Access Network
EsIoT Signal energy/interference over thermal
UE User Equipment
T Time T
E-UTRAN Evolved UMTS Terrestrial Radio Access Network
PCell Primary Cell
SCell Secondary Cell
PSCell Primary SCell
RSRP Reference Signal Received Power
LTE Long Term Evolution
PRACH Physical Random Access Channel
FR1 Frequencies <6 GHz
FR2 Frequencies >6 GHz
NR New Radio
DC Dual Connectivity
RRC Radio Resource Control
SIB System Information Block
eNB E-UTRAN (Evolved) Node B (Base station)
UE User Equipment

We claim:

1. A method, comprising:
receiving, at a user equipment operating in a connected mode, a configuration from a network to which the user equipment is connected, wherein the configuration comprises instructions to the user equipment for performing cell specific measurements of each of one or more detected cells, and wherein the configuration comprises instructions to maintain the configuration for performing the cell specific measurements of each of the one or more detected cells after connection release or when data exchange is suspended;
when connection initiation occurs after the connection release, performing the cell specific measurements of each of the one or more detected cells according to the received configuration, wherein the cell specific measurements are performed while the one or more detected cells remain detectable for the cell specific measurements, or
when the data exchange is resumed after the data exchange is suspended, performing the cell specific measurements of each of the one or more detected cells according to the received configuration, wherein the cell specific measurements are performed while the one or more detected cells remain detectable for the cell specific measurements; and
reporting the cell specific measurements to the network.

2. An apparatus, comprising:
at least one processor; and
at least one memory comprising computer program code, the at least one memory and computer program code configured, with the at least one processor, to cause the apparatus at least to:
receive a configuration from a network to which the apparatus is connected, wherein the configuration comprises instructions to the apparatus for performing cell specific measurements of each of one or more detected cells, and wherein the configuration comprises instructions to maintain the configuration for performing the cell specific measurements of each of the one or more detected cells after connection release or when data exchange is suspended;
when connection initiation occurs after the connection release, perform the cell specific measurements of each of the one or more detected cells according to the received configuration, wherein the cell specific measurements are performed while the one or more detected cells remain detectable for the cell specific measurements, or
when the data exchange is resumed after the data exchange is suspended, perform the cell specific measurements of each of the one or more detected cells according to the received configuration, wherein the cell specific measurements are performed while the one or more detected cells remain detectable for the cell specific measurements; and
report the cell specific measurements to the network.

3. The apparatus according to claim 2, wherein the configuration comprises an indication of a retention time for the measurements.

4. The apparatus according to claim 2, wherein, when one or more of the detected cells are no longer detectable, the at least one memory and computer program code are configured, with the at least one processor, to cause the apparatus at least to discard the configuration at least after waiting for a time period.

5. The apparatus according to claim 2, wherein the configuration comprises instructions to maintain a configuration of at least one of the detected cells after connection release or suspend.

6. The apparatus according to claim 5, wherein the configuration comprises an indication of how long the configuration of the at least one of the detected cells is to be maintained.

7. The apparatus according to claim 5, wherein the configuration of the at least one of the detected cells is indicated to be maintained for as long as the measurements are continued.

8. The apparatus according to claim 2, wherein the configuration comprises instructions to perform the measurements of specific carriers.

9. The apparatus according to claim 2, wherein the configuration comprises instructions to perform the measurements when the apparatus is transitioning to a connected mode.

10. The apparatus according to claim 2, wherein the configuration comprises a frequency to be measured other than a secondary cell frequency.

11. The apparatus according to claim 10, wherein the configuration comprises an indication that the frequency is to be measured when data exchange between the network and the apparatus is initiated.

12. An apparatus, comprising:
at least one processor; and
at least one memory comprising computer program code, the at least one memory and computer program code configured, with the at least one processor, to cause the apparatus at least to:
communicate with a user equipment in a connected mode;
provide a configuration from a network to which the user equipment is connected, wherein the configuration comprises instructions to the user equipment for performing cell specific measurements of each of one or more detected cells, and wherein the configuration comprises instructions to the user equipment to maintain the configuration for performing the cell specific measurements of each of the one or more detected cells after connection release or when data exchange is suspended; and
receive cell specific measurements from the user equipment according to the provided configuration when connection initiation occurs after the connection release, or receive cell specific measurements from the user equipment according to the provided configuration when the data exchange is resumed after the data exchange is suspended.

13. The apparatus according to claim 12, wherein the configuration comprises an indication of a retention time for the measurements.

14. The apparatus according to claim 12, wherein the configuration comprises an indication of how long the configuration of the at least one of the detected cells is to be maintained.

15. The apparatus according to claim 12, wherein the configuration comprises instructions to the user equipment to perform the measurements of specific carriers.

16. The apparatus according to claim 12, wherein the configuration comprises instructions to the user equipment to perform the measurements when transitioning to the connected mode.

17. The apparatus according to claim 12, wherein the configuration comprises a frequency to be measured other than a secondary cell frequency.

18. The apparatus according to claim 17, wherein the configuration comprises an indication that the frequency is to be measured when data exchange between the network and the user equipment is initiated.

19. A non-transitory computer readable medium comprising program instructions stored thereon for performing at least the method according to claim 1.

* * * * *